United States Patent
Borodulin et al.

(10) Patent No.: US 6,585,200 B2
(45) Date of Patent: Jul. 1, 2003

(54) UNIVERSAL PAN AND POT LID HOLDER

(76) Inventors: German Borodulin, 583 -46th Ave., San Francisco, CA (US) 94121; Alexander Shkolnik, 485 Dartmouth Ave., San Carlos, CA (US) 94070

(*) Notice: Subject to any disclaimer, the term of this patent is extended or adjusted under 35 U.S.C. 154(b) by 0 days.

(21) Appl. No.: 09/735,578

(22) Filed: Dec. 14, 2000

(65) Prior Publication Data

US 2002/0074464 A1 Jun. 20, 2002

(51) Int. Cl.[7] .................. F16M 11/00; A47G 21/14; A47G 23/02
(52) U.S. Cl. .............. 248/176.1; 248/37.3; 248/146
(58) Field of Search .............. 248/176.1, 146, 248/37.6, 37.3; 211/41.11, 70.7

(56) References Cited

U.S. PATENT DOCUMENTS

| | | | | |
|---|---|---|---|---|
| 1,885,788 A | * | 11/1932 | Westburg | 248/500 |
| 3,529,742 A | * | 9/1970 | Cumming | 220/69 |
| 4,790,503 A | * | 12/1988 | Pohler | 248/176 |
| D320,332 S | * | 10/1991 | Fetty | D7/638 |
| 5,127,616 A | | 7/1992 | Carney | |
| 5,396,993 A | * | 3/1995 | Spitler | 211/13 |
| 5,683,010 A | * | 11/1997 | Boyajian, Jr. | 220/744 |
| D389,703 S | * | 1/1998 | Marts | D7/601 |
| 5,810,308 A | * | 9/1998 | Lam | 248/302 |
| D401,496 S | * | 11/1998 | Lambert | D8/354 |
| 5,979,673 A | | 11/1999 | Dooley | |
| 6,012,593 A | * | 1/2000 | Knittel | 211/41.11 |

FOREIGN PATENT DOCUMENTS

JP   H7-255598   10/1995

* cited by examiner

Primary Examiner—Anita King
Assistant Examiner—Amy J. Sterling

(57) ABSTRACT

A universal pot and pan lid holder in the form of an open-top cylindrical body having at least one portion of its cylindrical side wall removable for access to the interior of the body from its side. The diameter of the cylindrical body should be smaller than the diameter of the lids to be supported. The removable portion has on its outer surface radial outward projections. For use as a lid support, the holder is placed onto the table or counter top with its open side up, the removable portion is removed from the cylindrical body and is placed onto the table or counter top, using the aforementioned radial projections as supports for the removed portion. When necessary, the hot or fatty pot or pan lid is placed during cooking onto the open top side of the cylindrical body with the internal (pot or pan covering) side of the lid facing up. Since the internal side of the lid faces up, dripping from the lid to the support surface is completely prevented. The cylindrical side wall may have two removable portions. The second removable portion may be located diametrically opposite to the first one and may have a flat pad on the outer side of the removable portion. When removed and placed onto the table or counter top with its flat pad up, this second removable portion may be used as a support for a a kettle, pan, pot, or the like. The perforations in the bottom of the holder make it possible to use it as a strainer for washing such foods products as fruits, vegetable, berries, rice, etc.

8 Claims, 5 Drawing Sheets

UNIVERSAL PAN AND POT LID HOLDER

FIELD OF THE INVENTION

The present invention relates to a pan and pot lid holder, in particular to a pan and pot lid holder, which is universal in use and fulfills many additional functions.

BACKGROUND OF THE INVENTION

When cooking with a pot or pan, a user must periodically remove the lid to stir the items therein or to add additional ingredients thereto. The lid is typically very hot and often has splattered food and condensation thereon. A hot lid can cause permanent damage to a counter top, a table or similar support surface if placed thereon. Even if the lid is not extremely hot, condensation and food residue will drip onto the counter top which is messy and inconvenient. Accordingly, there is a need for a device which allows a user to temporarily secure a hot or dirty pan lid eliminating the undesirable practice of placing it on a counter top.

Many pan and pot lid holders have been developed to hold a lid when it is either raised and is held on the appliance in an appliance open position or removed from the kitchen appliance and is placed onto a temporary support for use during cooking or onto a holder for long-term storage.

For example, Japanese Laid-Open Patent Application (Kokai) H7-255598 published on Oct. 9, 1995 (Inventor Narita) describes a pan lid holder which is integrally attached at an angle to the edge of the pan so that it extends radially outwardly. The holder has a longitudinal slot for insertion of a narrowed portion of the knob attached to the top of the pan lid. A disadvantage of this device is that, when the lid is placed onto the holder during cooking activity, the lid limits freedom of movement for the user. The holder of this type can be used only with the pan lid with a handle of a knob type and is not applicable for any other purposes.

U.S. Pat. No. 5,127,616 issued to Jack Carney on Jul. 7, 1992 describes a pot lid and utensil holder for holding pot lids and/or cooking utensils. The device includes a first generally planar component with separate notches, apertures, ledges or the like for supporting pot lids or cooking utensils. A second generally planar component is mounted to the first planar component to support this component and to selectively receive cooking utensils supported by the first planar component, as well as retain any drippings from the utensils.

Although the applicant of the aforementioned patent states that the device of his invention retains any dripping, it can be seen from FIG. 5 of the aforementioned patent that the position of the pan or pot lid on the holder of U.S. Pat. No. 5,127,616 does not prevent dripping to the cooking top or counter top. Furthermore, the device is unstable, especially when supports heavy lids. It is not sufficiently universal and can support only pot or pan lids and some kitchen utensils such as spoons or knifes. U.S. Pat. No. 5,979,673 issued in November of 1999 to P. Dooley describes a magnetic cooking utensil holder which allows a user to temporarily secure hot pan lids while cooking eliminating the undesirable practice of placing the hot and sometimes soiled lids on a counter top. The device includes a horizontal tubular magnet having a plurality of support legs pivotally attached thereto, which expand to form a tripod type support structure. A drip tray for collecting condensate or food residue adhering to the lid is removably attached to a pair of opposing support legs. A pair of opposing side arms each extending from an end of the magnet have a plurality of vertically aligned magnetic strips thereon for receiving additional cooking utensils such as knives, forks and spoons. Accordingly, whenever a user removes a lid to add ingredients or to stir the food within a pot or pan, the edge of the pan is placed within a drip tray with an opposing portion magnetically secured to the magnetic bar. The tripod type support structure allows the lid to be obliquely suspended with respect to the counter top so that any condensation or food residue adhering to the lid will easily drain into the drip tray.

A main disadvantage of the device of U.S. Pat. No. 5979673 is that its use is limited to holding only ferromagnetic items. Supporting of non-ferromagnetic items will be either impossible or would not provide stability of the supported items. The second disadvantage is that the residue drips from the lids to the tray, which has to be constantly cleaned from fatty substance. The third disadvantage is that the device is capable of supporting lids of a certain diameter. There is no support for lids of a small diameter and no stability for lids of a large diameter. Nothing prevents dripping from the items supported vertically on the side of the device to the counter top.

OBJECTS OF THE INVENTION

It is an object of the present invention to provide a pot and pan lid holder which is universal in its use, simple in construction, ensures stable support of pan and pot lids, prevents dripping from the lid to the cook or counter top, can be easily disassembled into parts convenient for storage and usable as additional supports for spoons, knifes, forks, kettles, pans, pots, napkins, etc., and ensures convenient access to handles of supported lids.

SUMMARY OF THE INVENTION

Provided is a universal pot and pan lid holder in the form of an open-top cylindrical body having at least one portion of its cylindrical side wall removable for access to the interior of the body from its side. The diameter of the cylindrical body should be smaller than the diameter of the lids to be supported. The removable portion has on its outer surface radial outward projections. For use as a lid support, the holder is placed onto the table or counter top with its open side up, the removable portion is removed from the cylindrical body and is placed onto the table or counter top, using the aforementioned radial projections as supports for the removed portion. When necessary, the hot or fatty pot or pan lid is placed during cooking onto the open top side of the cylindrical body with the internal (pot or pan covering) side of the lid facing up. Since the internal side of the lid faces up, dripping from the lid to the support surface is completely prevented. The cylindrical side wall may have two removable portions. The second removable portion may be located diametrically opposite to the first one and may have a flat pad on the outer side of the removable portion. When removed and placed onto the table or counter top with its flat pad up, this second removable portion may be used as a support for a kettle, pan, pot, or the like. The perforations in the bottom of the holder make it possible to use it as a strainer for washing such foods products as fruits, vegetable, berries, rice, etc.

DETAILED DESCRIPTION OF THE INVENTION

Figure 1:
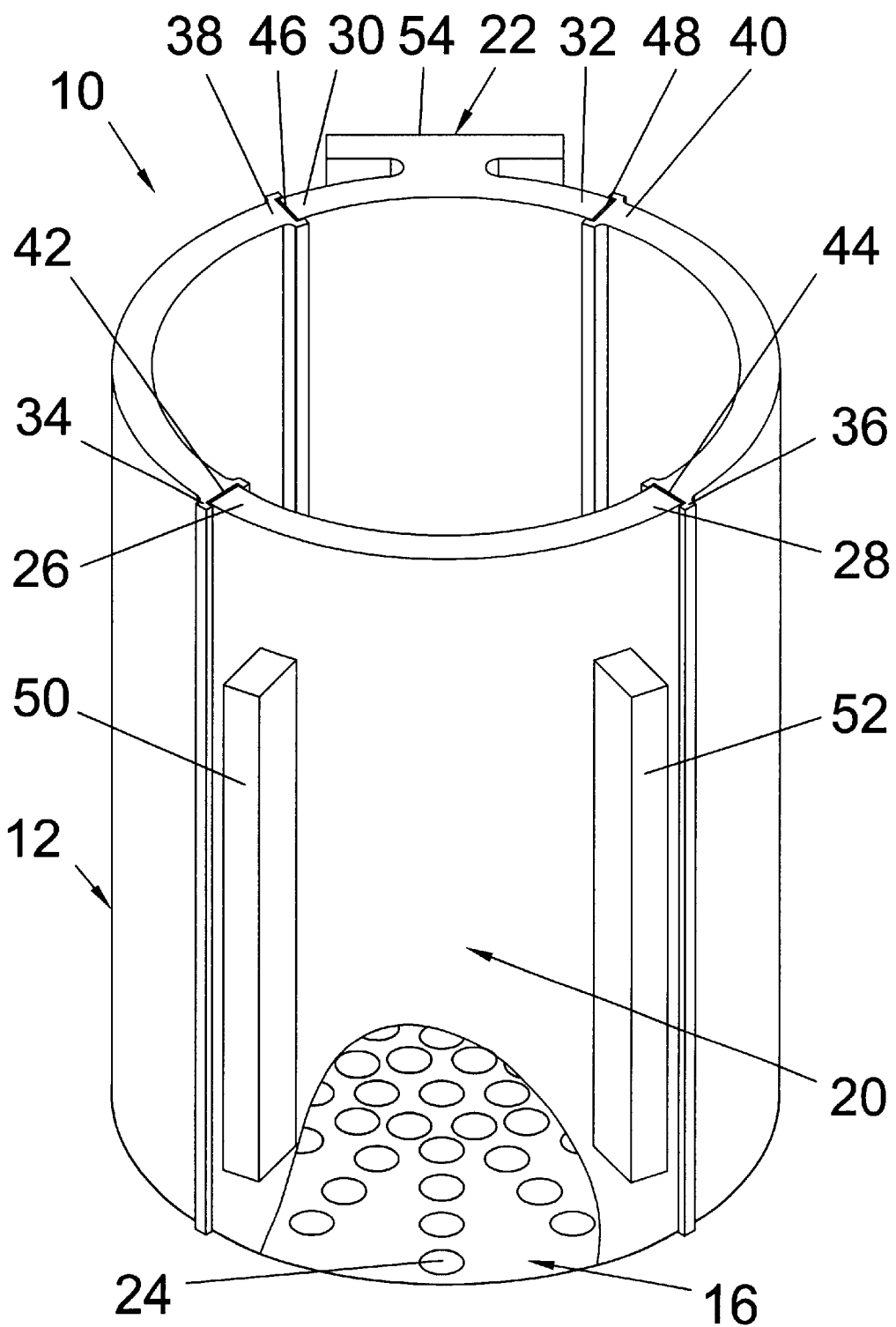
FIG. 1 is a general three-dimensional view of a universal pan and pot lid holder of the invention in an assembled state.

A general three-dimensional view of a universal pan and pot lid holder of the invention is shown in FIG. 1. As can be seen from this drawing, the holder, which in general is designated by reference numeral 10, has a cylindrical housing 12 with an open top 14 and a closed bottom portion 16. The housing has a composite structure and consists of the main portion 18 and removable segments 20 and 22 located preferably, but not necessarily, approximately opposite each other. In an assembled state the main portion 18 and the removable segments 20 and 22 form a complete cylindrical body. In the embodiment shown in FIG. 1, the main portion 18 is made integrally with the bottom portion 16. The bottom portion may have perforation 24 for use of the holder 10 in an assembled state as a strainer.

In the areas of connection with the edges 26, 28 and 30, 32 of the removable segments 20 and 22, the edges on the segments of the main portion 18 may have respective thickened lugs 34, 36 and 38, 40 with respective vertical guide slots 42, 44 and 46, 48 for slidingly inserting the edges of the removable segments 20 and 22 and for holding them in place when the holder is assembled to the condition shown in FIG. 1.

At least one of the removable segments, e.g., segment 20, should have a width exceeding the width of the fist of a human hand. The diameter of the top opening 14 of holder 10 should be smaller than the diameters of the pan or pot lids (not shown in FIG. 1), which has to be supported by the holder.

As shown in FIG. 1, the removable segment 20 may have on its outer surface two radial outward projections 50 and 52, while the removable segment 22 may have a plate-like pad 54 attached, e.g., glued or fused to the outer surface of this segment, or molded integrally therewith. In use, the assembled pan and pot lid holder 10 of the invention may be utilized as a container for retaining some food products such as fruits or vegetable. If necessary, the holder can be used as a strainer for washing fruits or other products contained in the holder. This is possible due to the provision of the perforations 24.

Figure 2:
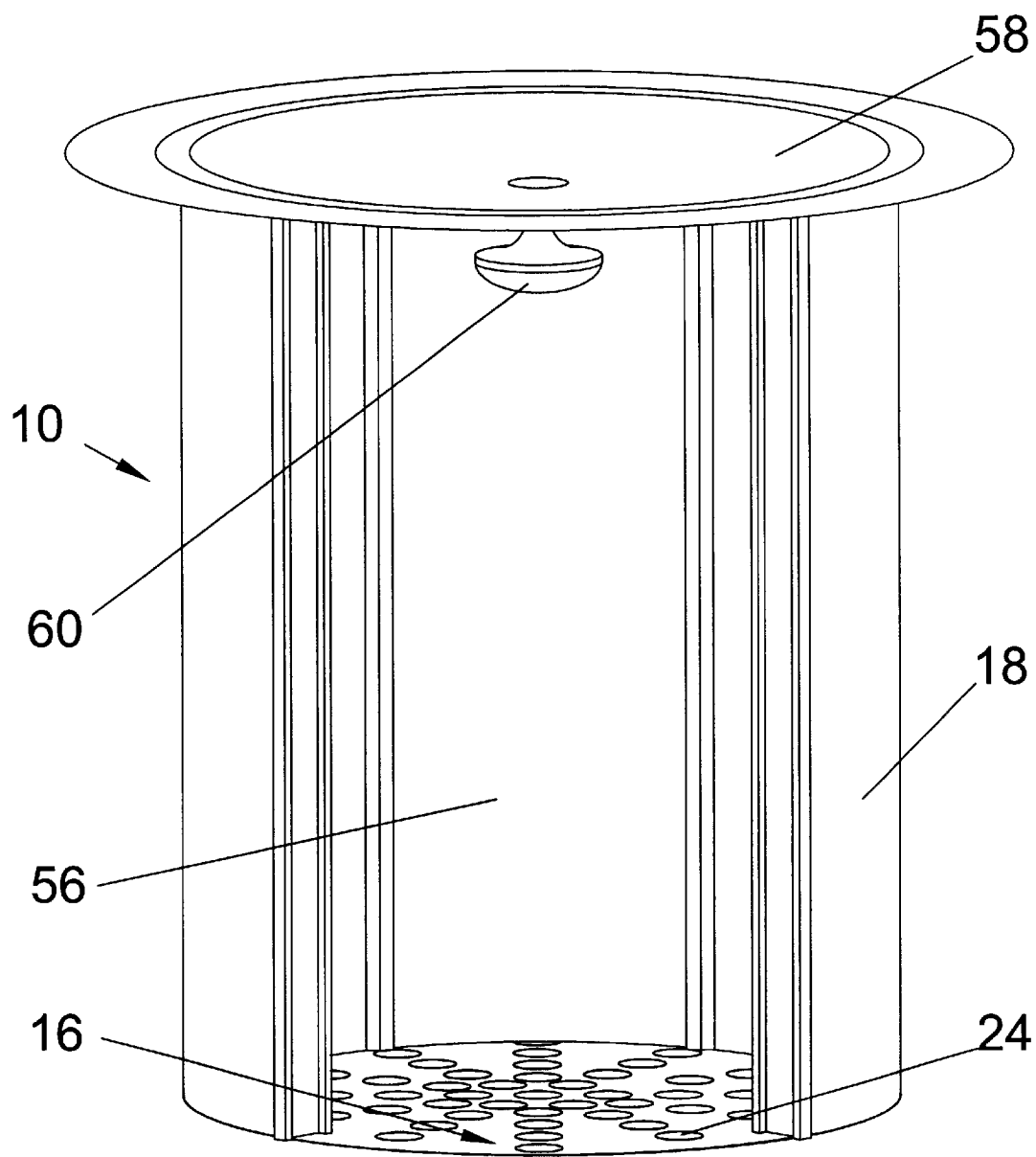
FIG. 2 is a three-dimensional view of the holder of the invention with one segment removed and a pan lid supported by the holder.

When the holder 10 is disassembled, as shown in FIG. 2, i.e., when at least one of the removable segments, e.g., the segment 20, is removed, a relatively wide vertical window 56, which extends from the bottom portion 16 to the top 14 (FIG. 1) is formed. When it is necessary, during cooking, to temporary open the pan or pot and remove the lid 58, the latter can be conveniently placed onto the top of the cylindrical main portion 18 with the edges of the lid resting on the upper edges of the main portion 16 and with the handle 60 of the lid 58 facing down. The placement of the lid, which may be hot or coated with fatty liquid, is done by inserting the hand, in which the lid is held, into the window 56, while holding the lid above the upper edge of the main portion 18, and then slowly descending the hand until the lid rests onto the upper edges of the main portion 18. Since the wet or soiled surface of the lid faces up, no dripping is possible.

Figure 3:
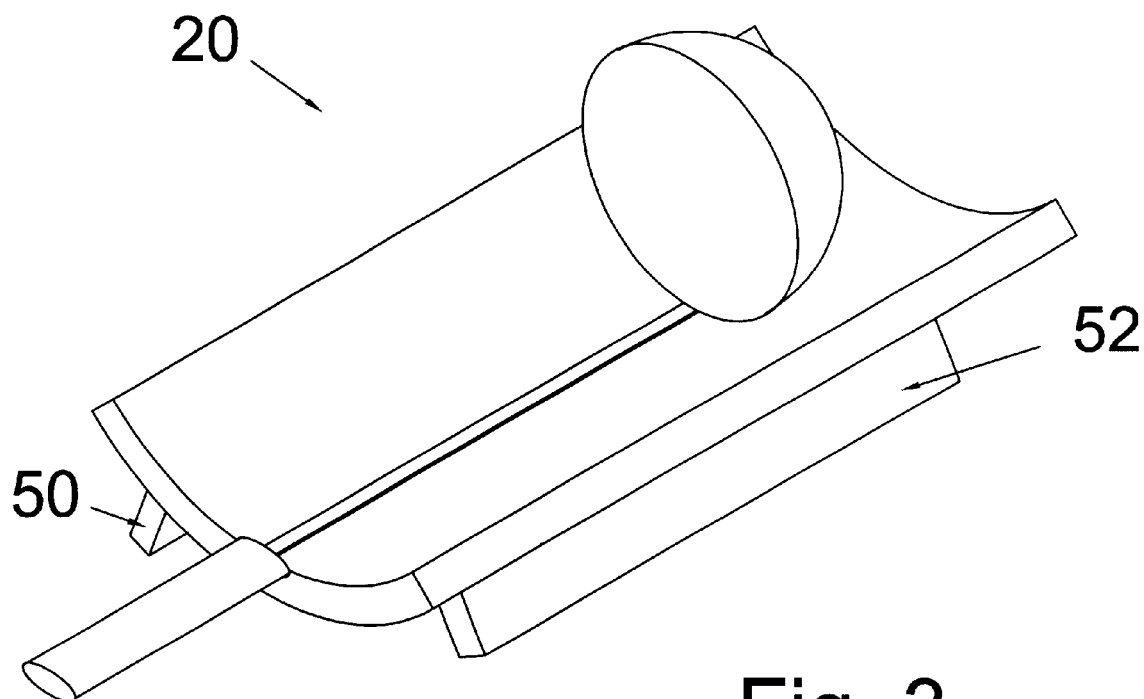
FIG. 3 is a three-dimensional view of a removable segment with radial extensions as supporting legs.
Figure 4:
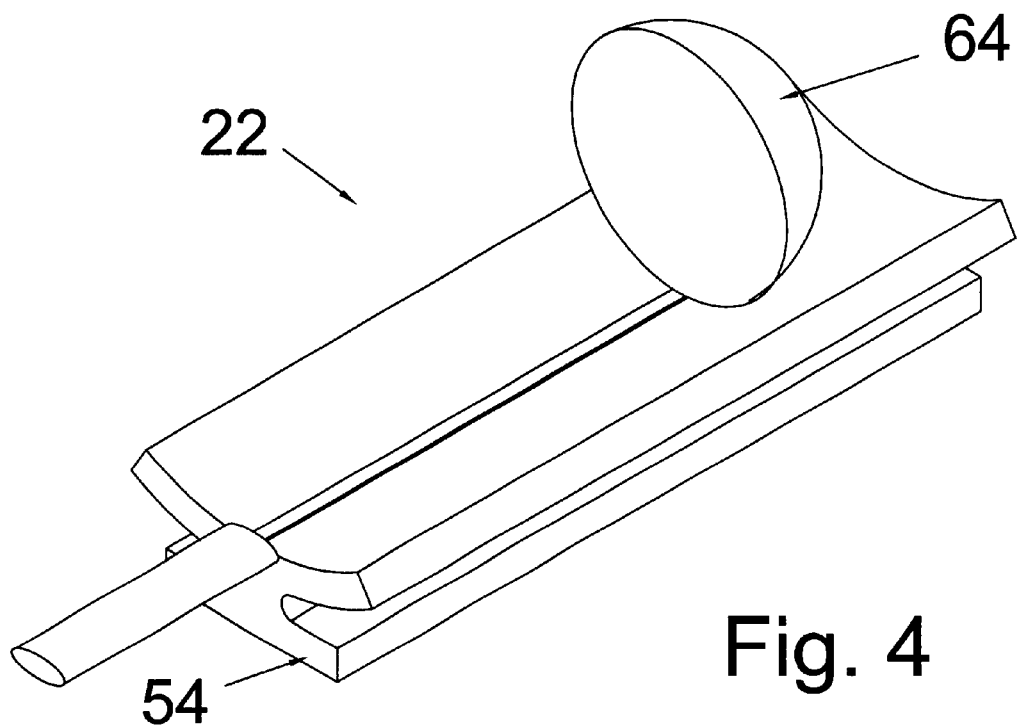
FIG. 4 is a three-dimensional view of a removable segment with a flat supporting portion.
Figure 5:
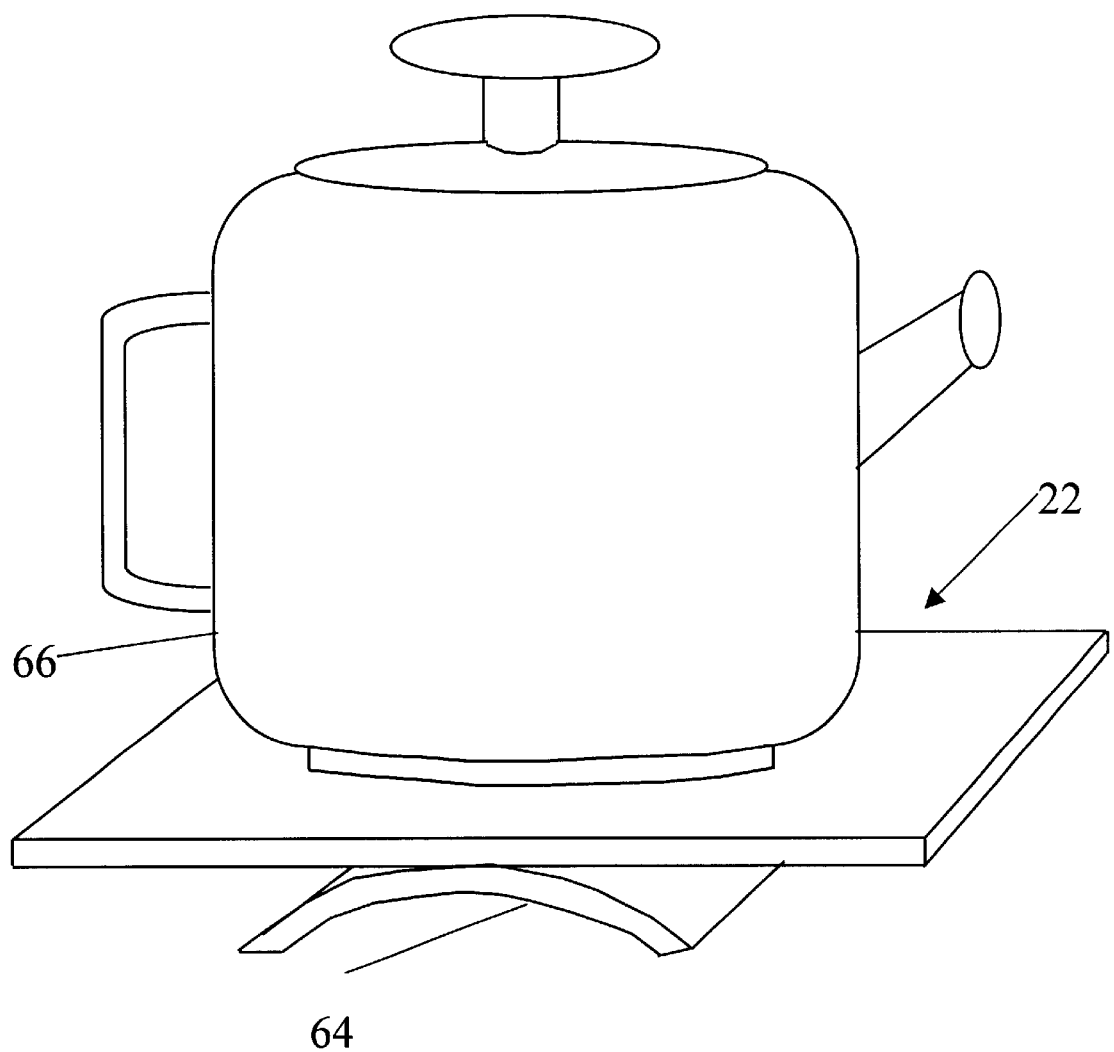
FIG. 5 is a three-dimensional view of a removable segment of FIG. 4 in a position with its flat side facing up for supporting kettles, pans, pots, etc.

Meanwhile, as shown in FIG. 3, which is a three-dimensional view of the removable segment 20, the removed segment 20 can be placed onto the counter top or a table with the use of the projections 50 and 52 as supports, so that the inner cylindrical surface 62 of the segment can be used fo supporting forks, spoons, knives, or the like. Similarly, as shown in FIG. 4, which is a three-dimensional view of the removable segment 22, the same function as described above, can be fulfilled by the removable segment 22, when it is supported by its plate-like pad 54. Alternatively, the removable segment 22 can be placed onto the kitchen top or a counter with its plate-like pad 54 up, so that it will be supported by the cylindrical portion 64, while the pad 54 can be used for supporting a pan or a kettle 66, which is shown, e.g., in FIG. 5.

Figure 6:
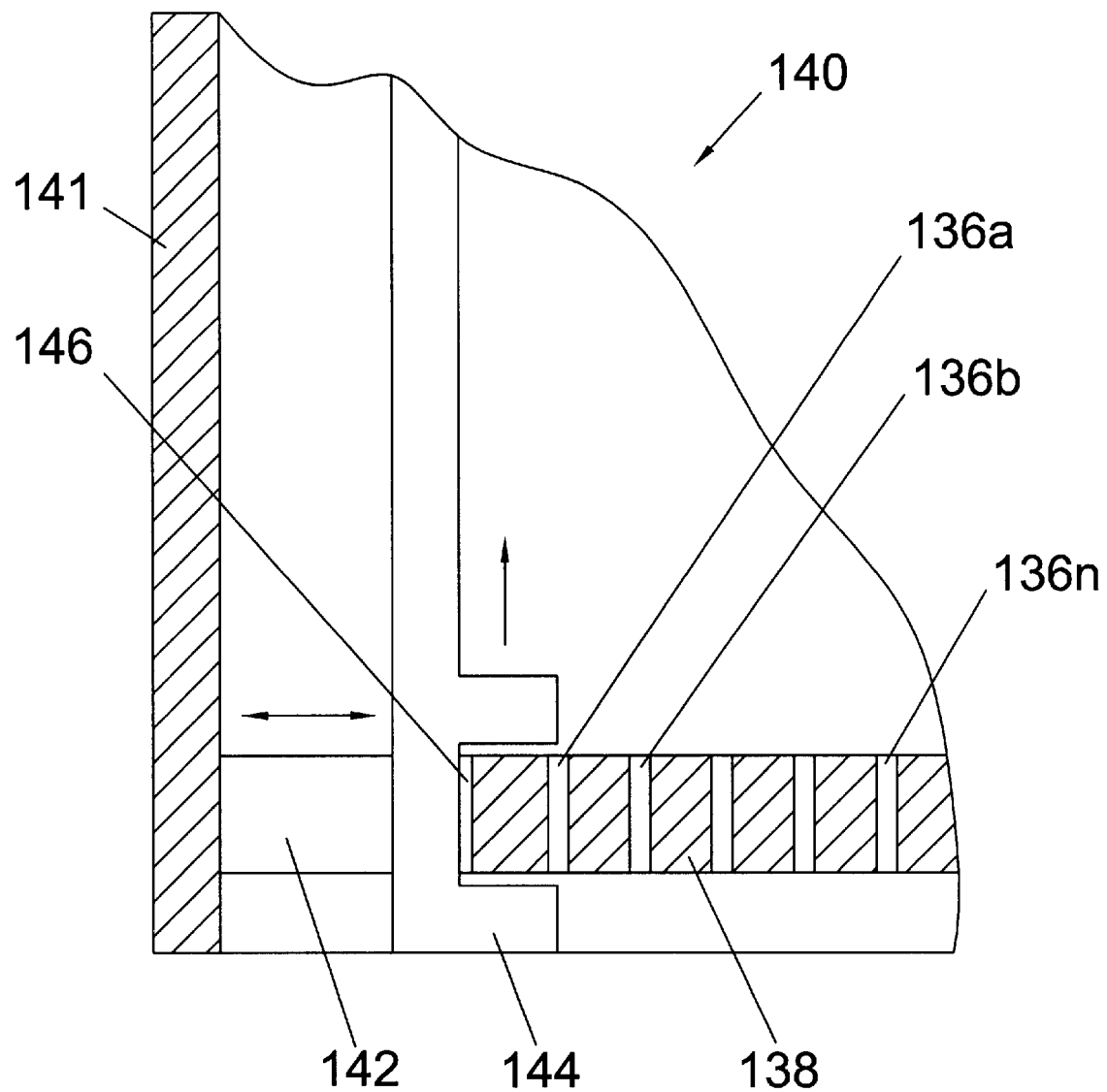
FIG. 6 is a three-dimensional exploded view of a pan and pot lid holder made in accordance with another embodiment of the invention, according to which the main portion of the holder can be further disassembled, so that the holder may consist of many separate parts.

FIG. 6 is a fragmental view of the embodiment of the pot and pan lid holder 140 with a removable bottom portion 138 in the form of a disk. This disk may have perforations 136a, 136b,...136n. The holder 140 is in general the same as that shown in the previous embodiments.

The main portion 141 of the holder housing is made in a manner shown in FIG. 6. More specifically, the bottom portion 138 has a circular slot 142, while the lower edge of the main portion 141 has a short projection 144 having a length equal to or slightly shorter than the length of the slot 142 and a U-shaped slot 146 having a width equal to or slightly wider than the thickness of the bottom portion 138.

For attachment of the main portion 141 to the bottom portion 138 of the holder, the short projection 144 is inserted into the circular slot 142 of the bottom portion 138 to a position, in which the slot 146 is aligned with the bottom portion 138. The segment is then moved radially inwardly so that the adjacent part of the bottom portion 138 is inserted into the slot 146 of the projection 144. The main portion is then shifted by moving the projection circumferentially in the circular slot for fixation. In order words, the projection 144 and the slot 142 form a kind of a bayonet connection.

Thus, it has been shown that the invention provides a pot and pan lid holder which is universal in its use, ensures stable support of pan and pot lids, simple in construction, prevents dripping from the lid to the cook or counter top, can be easily disassembled into parts convenient for storage and usable as additional supports for spoons, knifes, forks, kettles, pans, pots, etc., and ensure convenient access to handles of supported lids.

Although the invention has been shown and described with reference to specific embodiments, it is understood that these embodiments do not limit the application of the invention and that any changes and modifications are possible, provided they do not depart from the scope of the patent claims. For example, such parts of the segments as radial projections 50, 52, pad 54, etc., can be integrally molded, glued, or mechanically connected to the segments.

The number of removable segments shown in the embodiment of FIG. 6 may be different that shown in this drawing. The segments can be made from different materials such as metal or heat-resistant glass or plastic. The holder housing may have a cross-section different from circular.

What is claimed is:

1. A universal pan and pot lid holder comprising at least a first member, a second member, said first member and said second member having means for moveably connecting said first member and said second member to each other, at least one of said first and said second members having means for imparting an additional function to said universal pan and pot lid holder, said holder having at least one open end and a side wall with an opening for access to the interior of said holder through said opening, said first member comprising a cylindrical housing which has means for removably connecting said second member to form an assembled state, said second member being a first cylindrical segment having an outer surface and an inner cylindrical surface, in said assembled state said cylindrical housing and said first cylindrical segment forming a complete cylindrical body, said means for imparting an additional function comprising radial outward projections formed on said outer side of said first cylindrical segment, so that said radial outward projections can be used as supports for said first cylindrical segment with said inner cylindrical surface facing up for use as a support for various items.

2. The holder of claim 1, said cylindrical housing has, on its side substantially opposite to said first cylindrical segment, means for removably connecting a second cylindrical segment having an inner side and an outer side with second means that impart to said holder an additional function.

3. The holder of claim 1, wherein said first cylindrical segment and said second cylindrical segment have side edges, said means for removably connecting said first cylindrical segment and said means for removably connecting said second cylindrical member comprising longitudinal slots formed on side edges of said cylindrical housing, said side edges of said first and second cylindrical segments being slidingly inserted into said longitudinal slots.

4. The holder of claim 3, wherein said means on said second cylindrical segment that impart to said holder an additional function comprises a flat pad, so that when said second cylindrical segment is removed from said cylindrical housing and is placed with said flat pad up, said flat pad can be used as a support member for various items.

5. The holder of claim 1, wherein said cylindrical housing is further provided with a closed bottom portion on the side opposite to said open end, so that in said assembled state said holder forms a container.

6. The holder of claim 5, wherein said closed bottom portion has perforations for using said container as a strainer.

7. The holder of claim 5, wherein said first member and said second member each has a radial projection with a slot and wherein said closed bottom portion has a circular slot into which said projection is inserted to a position in which said slot of said projection is aligned with said bottom portion so that by moving said first and second portions in a circumferential direction said first and second portion are removably secured to said bottom portion.

8. The holder of claim 7, wherein said closed bottom portion has perforations for using said container as a strainer.

* * * * *